(12) United States Patent
Clayton (10) Patent No.: US 8,995,954 B2
(45) Date of Patent: *Mar. 31, 2015

(54) MOBILE DEVICE NOTIFICATION WITH OPTIONS

(71) Applicant: AT&T Mobility II LLC, Atlanta, GA (US)

(72) Inventor: Steve Clayton, Skillman, NJ (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/747,962

(22) Filed: Jan. 23, 2013

(65) Prior Publication Data

US 2013/0137407 A1    May 30, 2013

Related U.S. Application Data

(63) Continuation of application No. 12/637,970, filed on Dec. 15, 2009, now Pat. No. 8,396,450, which is a continuation of application No. 11/850,195, filed on Sep. 5, 2007, now Pat. No. 7,657,250, which is a continuation of application No. 10/857,666, filed on May 28, 2004, now Pat. No. 7,280,818.

(51) Int. Cl.
*H04W 4/12* (2009.01)
*H04L 12/66* (2006.01)

(52) U.S. Cl.
CPC ...... *H04W 4/12* (2013.01); *H04L 12/66* (2013.01)
USPC ........ 455/407; 455/404.1; 455/405; 455/406; 455/412.2; 455/422.1

(58) Field of Classification Search
CPC ................................. H04W 4/00; H04W 8/18
USPC .................. 455/404.1, 405–407, 412.2, 422.1
See application file for complete search history.

(56) References Cited

U.S. PATENT DOCUMENTS

| | | |
|---|---|---|
| 5,559,871 A | 9/1996 | Smith |
| 5,577,100 A | 11/1996 | McGregor et al. |
| 5,749,052 A | 5/1998 | Hidem et al. |
| 5,794,140 A | 8/1998 | Sawyer |
| 5,799,072 A | 8/1998 | Vulcan et al. |
| 5,862,485 A | 1/1999 | Linneweh, Jr. et al. |
| 5,970,403 A | 10/1999 | Alperovich et al. |
| 5,974,308 A | 10/1999 | Vedel |
| 6,021,125 A | 2/2000 | Sakoda et al. |

(Continued)

*Primary Examiner* — Amancio Gonzalez
(74) *Attorney, Agent, or Firm* — Baker & Hostetler LLP (57) ABSTRACT

Notifying users of mobile communication devices, which may include providing options for response to notifications. A component of a communication service provider system receives an indication of a notification for a user of a mobile communication device. The notification may be received from a source internal or external to the communication service provider system. A component of the mobile communication service provider formats the notification so that it is compatible with the mobile communication device of the user and sends the notification to the mobile communication device of the user. The notification may include one or more options to respond to the notification using the mobile communication device. The notification may, for example, pertain to minutes-of-use in a mobile communication service plan, or to other information, including notifications from outside service providers such as airlines, banks, restaurants, hotels, libraries, credit card companies, etc.

20 Claims, 11 Drawing Sheets

(56) References Cited

U.S. PATENT DOCUMENTS

| | | |
|---|---|---|
| 6,493,547 B1 | 12/2002 | Raith |
| 6,532,284 B2 | 3/2003 | Walker et al. |
| 6,564,047 B1 | 5/2003 | Steele et al. |
| 6,577,717 B1 | 6/2003 | Henon |
| 6,622,017 B1 | 9/2003 | Hoffman |
| 6,711,474 B1 | 3/2004 | Treyz et al. |
| 6,941,134 B2 | 9/2005 | White |
| 6,970,692 B2 | 11/2005 | Tysor |
| 6,999,748 B2 | 2/2006 | White |
| 7,058,387 B2 | 6/2006 | Kumar et al. |
| 7,092,724 B2 | 8/2006 | Fellenstein et al. |
| 7,110,749 B2 | 9/2006 | Zellner et al. |
| 7,113,150 B2 | 9/2006 | Thomason |
| 7,113,776 B2 | 9/2006 | Minear et al. |
| 7,123,933 B2 | 10/2006 | Poor et al. |
| 7,188,159 B2 | 3/2007 | Ralston et al. |
| 7,203,502 B2 | 4/2007 | Wilson et al. |
| 7,221,929 B2 | 5/2007 | Lee et al. |
| 7,224,978 B2 | 5/2007 | Zellner et al. |
| 7,266,363 B2 | 9/2007 | Johnson et al. |
| 7,280,818 B2 | 10/2007 | Clayton |
| 7,548,754 B2 | 6/2009 | Shivaram et al. |
| 7,644,444 B2 | 1/2010 | Kamiya et al. |
| 7,650,157 B2 | 1/2010 | Clayton |
| 7,657,250 B2 | 2/2010 | Clayton |
| 7,664,484 B2 | 2/2010 | Marsh et al. |
| 7,708,190 B2 | 5/2010 | Brandt et al. |
| 7,714,778 B2 | 5/2010 | Dupray |
| 8,396,450 B2 * | 3/2013 | Clayton ............. 455/407 |
| 8,467,502 B2 * | 6/2013 | Sureka et al. ........ 379/88.12 |
| 2002/0022472 A1 | 2/2002 | Walter et al. |
| 2002/0065046 A1 | 5/2002 | Mankins et al. |
| 2002/0085027 A1 | 7/2002 | Kim |
| 2002/0107000 A1 | 8/2002 | Goss et al. |
| 2003/0045266 A1 | 3/2003 | Staskal et al. |
| 2003/0202104 A1 | 10/2003 | Werner |
| 2004/0123147 A1 | 6/2004 | White |
| 2004/0127193 A1 | 7/2004 | Timmins et al. |
| 2004/0132449 A1 | 7/2004 | Kowarsch |
| 2004/0198386 A1 | 10/2004 | Dupray |
| 2004/0209595 A1 | 10/2004 | Bekanich |
| 2005/0013423 A1 | 1/2005 | Eversen et al. |
| 2005/0182718 A1 * | 8/2005 | Kortum et al. ............. 705/40 |
| 2005/0220280 A1 * | 10/2005 | Steinberg ............. 379/93.12 |
| 2008/0275820 A1 * | 11/2008 | Joao et al. ............. 705/44 |
| 2010/0093309 A1 | 4/2010 | Clayton |

* cited by examiner

| Monthly charge | Regular Minutes | Night/Weekend Minutes | Long Distance | Additional Airtime per Minute |
|---|---|---|---|---|
| 19.99 | 45 | --- | --- | $0.45 |
| 29.99 | 350 | Unlimited | Included | $0.45 |
| 39.99 | 600 | Unlimited | Included | $0.40 |
| 49.99 | 800 | Unlimited | Included | $0.40 |
| 74.99 | 1200 | Unlimited | Included | $0.35 |
| 99.99 | 1600 | Unlimited | Included | $0.30 |
| 149.99 | 2400 | Unlimited | Included | $0.30 |
| 199.99 | 3400 | Unlimited | Included | $0.25 |
| 299.99 | 5000 | Unlimited | Included | $0.25 |

MOBILE DEVICE NOTIFICATION WITH OPTIONS

CROSS-REFERENCE TO RELATED APPLICATIONS

This application is a continuation of U.S. patent application Ser. No. 12/637,970, filed Dec. 15, 2009, now U.S. Pat. No. 8,396,450, issued on Mar. 12, 2013, which is a continuation of U.S. patent application Ser. No. 11/850,195, filed Sep. 5, 2007, now U.S. Pat. No. 7,657,250, issued on Feb. 2, 2010, which is a continuation of U.S. patent application Ser. No. 10/857,666, filed May 28, 2004, now U.S. Pat. No. 7,280,818, issued Oct. 9, 2007, all of which are entitled "Mobile Device Notification with Options" and herein incorporated by reference in their entirety.

The present application is related to U.S. patent application. Ser. No. 10/324,354, filed Dec. 19, 2002, now U.S. Pat. No. 6,999,748, issued Feb. 14, 2006, entitled "Automated Device Behavior Management Based on Network Charging and Rating Conditions" by Christopher White, which is commonly owned with this application and herein incorporated by reference.

BACKGROUND

Users of communication services, such as wireless phone services, text-messaging services, etc., typically agree on rating and charging terms in a service provider agreement. The service provider, or carrier, may offer a variety of plans with different variables. The variables include the amount of air time per billing cycle that is charged at a minimum rate, more favorable rates during "off-peak" times such as nights and weekends (as opposed to "on-peak" or "peak") times, different rates for on-network use and roaming use, fees for special services such as call conferencing and email usage, etc. The amount of time available per billing cycle at a certain rate is sometimes referred to as the amount of time in a "bucket."

Typically, when a user exceeds their bucket time in a given billing cycle, the user will be charged additional fees for the use of the service. For example, Jane chooses a monthly service plan with 350 peak minutes per month, and 25 text messages. Before the billing cycle ends, Jane uses the 350 bucket minutes. From that point on, Jane is charged for airtime at a rate of $0.35 per minute. A few days later, Jane exceeds the limit for 25 text messages. Accordingly, Jane is charged an additional $0.50 per text message through the end of the billing cycle. In this type of situation, unless the user knows that they have exceed or are close to exceeding their bucket thresholds, they are in a poor position to prevent incurring additional fees, and may be unpleasantly surprised when they receive their monthly service bills containing the extra charges.

Thus, users of communication services can benefit from having an awareness of how much money they will spend if they use their devices at a certain time or in a certain way. As shown in the example above, awareness of charges and rates is important with both voice and data connections. While some devices track how much time has been used by having the user press keys on the keypad, to obtain locally-stored usage information, this tracking is sometimes inconsistent with the user's rate plan and can be confusing or even misleading. Moreover, while some wireless service providers allow users to find out information about their current use levels, for example, by calling their wireless service provider, taking such affirmative steps may be inconvenient and time-consuming for the user. For example, a user seeking service charge and use information may need to navigate through a complicated automated phone system to obtain the information he or she needs. Additionally, because typical rate plans often include confusing exceptions and options, it may sometime be difficult for the user to determine exactly when he or she will exceed usage thresholds that will result in extra charges.

In the drawings, the same reference numbers identify identical or substantially similar elements or acts. To easily identify the discussion of any particular element or act, the most significant digit or digits in a reference number refer to the Figure number in which that element is first introduced (e.g., element 304 is first introduced and discussed with respect to FIG. 3).

DETAILED DESCRIPTION

The invention will now be described with respect to various embodiments. The following description provides specific details for a thorough understanding of, and enabling description for, these embodiments of the invention. However, one skilled in the art will understand that the invention may be practiced without these details. In other instances, well-known structures and functions have not been shown or described in detail to avoid unnecessarily obscuring the description of the embodiments of the invention.

It is intended that the terminology used in the description presented be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this Detailed Description section.

I. OVERVIEW

Embodiments of the invention, described below, include a method of providing notifications to a user of a mobile device and, in some embodiments, providing options with the notifications, wherein the options may be executable, at least in part, via the mobile device. For example, notifications can be provided to users for managing the use of a wireless device based on rate plan conditions, such as minutes or kilobytes remaining for use within a given billing cycle. The initial rate plan conditions are typically agreed upon by a mobile communication service provider and a user, but are often controlled by the service provider. In some embodiments, customers are notified when they reach pre-determined usage "milestones." Notification techniques can include voice notification, SMS/messaging, emails, voicemails, etc. A notification can be combined with an offer for a rate plan upgrade, so that the user can upgrade rate plans to avoid being charged extra use charges and/or higher rates. For example, a user may be able to upgrade to a higher minute rate plan (thus avoiding extra airtime charges) by responding to a notification message indicating that the user is close to exceeding his or her allotted minutes-of-use for a current rate plan.

Notifications can be provided at various times. For example, a notification message may be sent instantly when a user reaches a predetermined threshold consistent with the user's rate plan. If the user is currently using the device at the time that the notification is sent, the notification may be accessed by the user after the call. In another example, a notification message may be sent before a call is placed (so that the user has the option of limiting the call based on the notification) or after a call is made, so that the user has information that will be useful for future calls.

The concept of providing such notification with options via the mobile device can be extended into other areas besides minutes-of-use notifications. For example, the mobile device can be used to provide notifications originating from external systems (e.g., airline systems, credit card or bank systems, entertainment systems, retail systems, etc.). In some embodiments, the mobile communication service provider system can communicate with external web services to transfer notifications to a user's mobile device (e.g., in the form of a voicemail or text message). In other embodiments, notifications can be generated at the communication service provider system in response to some indication received from the external service. For example, the service provider system may be configured to track packages sent via a ground transportation service. When the package reaches its destination, the web service of the ground transportation service may provide an indication of the status. The service provider system can then generate a message indicating that the package has arrived and send it to the customer's device.

The user may be able to specify if, when, and how notifications are provided. Additionally, notifications can be customized for the user depending on user preferences. Users may be provided with the opportunity to respond to notifications and the response may be ultimately delivered to the external system.

II. REPRESENTATIVE SYSTEM

Figure 1:
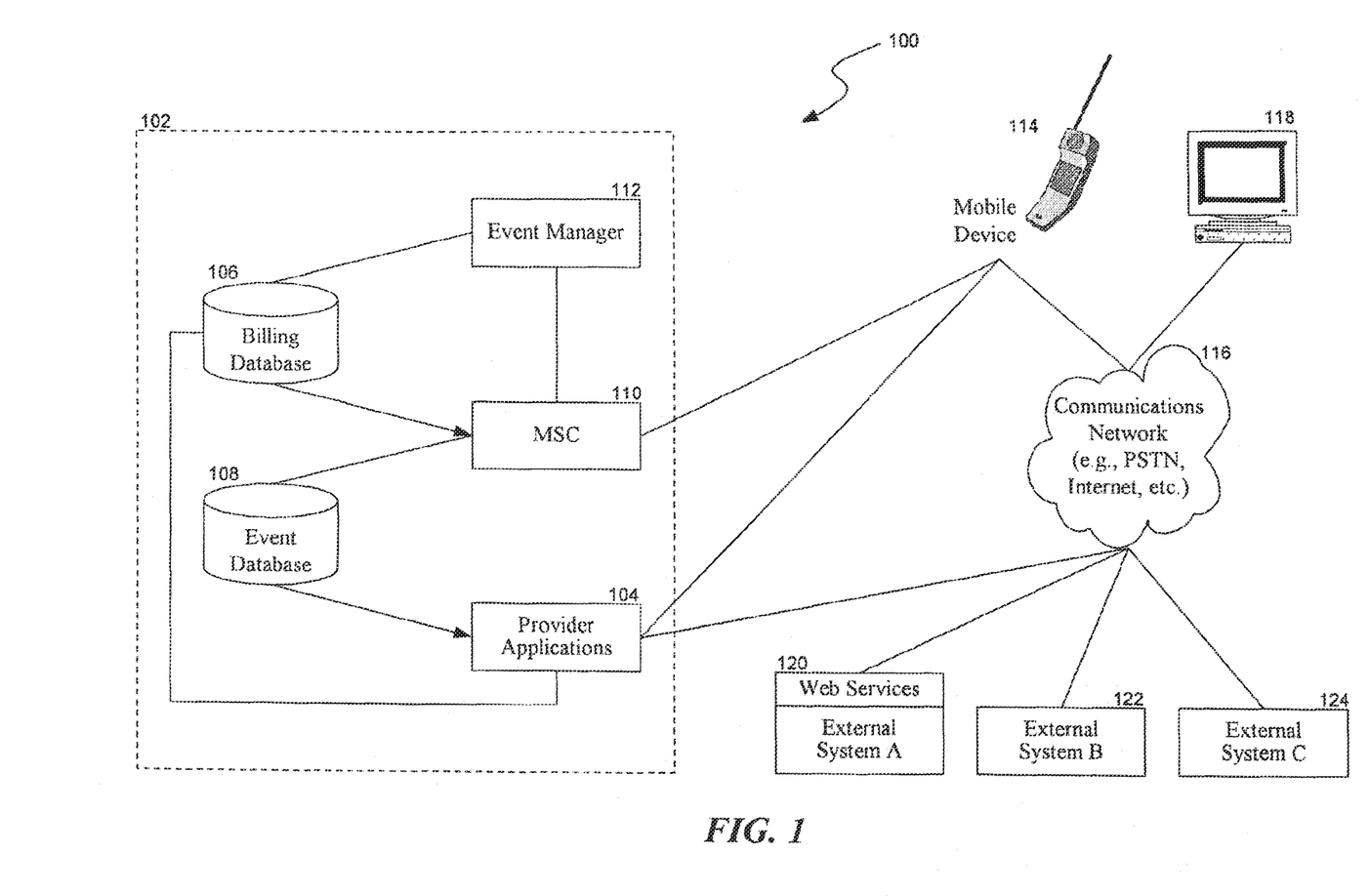
FIG. 1 is a block diagram showing an example of a communication system in which one embodiment of the invention can be implemented.

FIG. 1 is a diagram of an embodiment of a wireless communication system 100. The system 100 is an example of one arrangement of elements, but others are possible. The system 100 includes a communication service provider subsystem 102. A cellular phone service provider is one example of a communication service provider, but other examples include any service provider that provides mobile communication capabilities through a user device over a network. For example, service providers that support personal digital assistants (PDAs) are also providers for purposes of the embodiments described.

The communication service provider subsystem 102 includes equipment and applications typically provided and maintained by a communication service provider. Many typically known elements of provider equipment are not shown because they do not add to the understanding of the embodiments. For example, various computers or data processors are not shown, but are known to be part of the communication service provider equipment. Additionally, communication infrastructure such as radio towers, base stations, switching centers, etc., is not shown.

The service provider subsystem 102 may also include provider applications 104, which are typically software applications that maintain and administer the network. For example, the provider applications 104 may include billing applications, performance monitoring applications, and many more. The provider applications 104 may also include applications for tracking user accounts, which are typically designated by a responsible billing party. Each account may include one user with one device or a group of many users each with a respective device. For example, some enterprises provide groups of employees with devices for limited or unlimited use in the course of employment.

The communication service provider subsystem 102 further includes a database or databases (106 and 108). The databases (106 and 108) are shown separately to distinguish the types of data stored, but could be one physical entity or more than two physical entities. The database 106 is a billing database that stores data used by the provider to generate bills for an account. Billing data includes all of the information in the user's rate plan, such as number of minutes in a bucket, bucket rates, out of bucket rates, etc.

The database 108 is an event database that stores information relating to when and how user will receive notifications. The information in this database may be specific to the different available rate plans, external entities, and/or may be customized to reflect user's personal preferences (e.g., user's choices regarding what conditions the user would like the device to be automatically notified of).

A message service controller (MSC) 110 manages messaging, including receiving/sending, generating, and encoding/decoding notification and response messages. While the illustrated system 100 provides for the use of short message service (SMS), other messaging techniques may also be employed without departing from the scope of the invention.

An event manager 112 recognizes events that prompt sending a notification and sends a message to the MSC in response. These events may be internal to the communication service provider subsystem 102 (e.g., threshold reached for minutes-of-use) or, in some embodiments, external to the subsystem (notification from credit card company, bank, airline, etc.).

A mobile communication device 114, receives notifications from the communication service provider subsystem 102 and facilitates other activities associated with mobile communication (facilitates making calls, retrieving voice messages, etc.). Communication between the communication device 114 and the service provider subsystem 102 takes place via a communication network 116. While a mobile phone is shown as the mobile communication device 114 in the embodiments illustrated in FIG. 1, those skilled in the relevant art will appreciate that the invention can be practiced with other devices and configurations, including Internet appliances, hand-held devices, wearable computers, multi-processor systems, microprocessor-based or programmable consumer electronics, set-top boxes, PDA's (Personal Digital Assistants), portable laptop computers, and the like. The term "mobile device" is intended to include all such devices.

In some embodiments, a user of the mobile communication device 114 may configure the information stored in the event database 108 by accessing a dedicated provider configuration application (one of the provider applications 104). Accordingly, mobile device users may be able to access some of the provider applications 104, such as the configuration application, via the mobile communication device 114 or, in some cases, a personal computer 118. In this way, "user preferences" may be developed by the provider configuration application.

Notifications can be sent to users and accessed, for example, via the mobile device 114 (e.g., via VXML, SMS, voice, etc.) or the personal computer 118 (e.g., via email or instant message). The user can configure the user preference information stored in the event database 108 accordingly. For example, the user may configure the user preferences such that a downloaded email application only sends or receives emails during an off-peak period.

The mobile device 114 includes downloaded applications (not shown in FIG. 1) that may come from the provider or any third party. Downloaded applications from the provider may be configured in the same way as preferences, as described above.

Activities relating to one or more external systems (120, 122, and 124) may be the subject of notifications to the user of the communication device. Such external systems (120, 122, and 124) can be associated with, banks, airlines, hotels, retailers, etc. Some of these external systems can have web services or portals. In some embodiments, applications and components, such as the provider applications 104 and the event manager component 112, can communicate directly with (and possibly mine information from) these web services or portals. Alternatively, notifications that would otherwise be sent to the user via, for example, email, may be forwarded instead to the MSC 110 and then transmitted to the user's device using one-way communication from the web services or a portal to the communication service provider subsystem 102.

Figure 2:
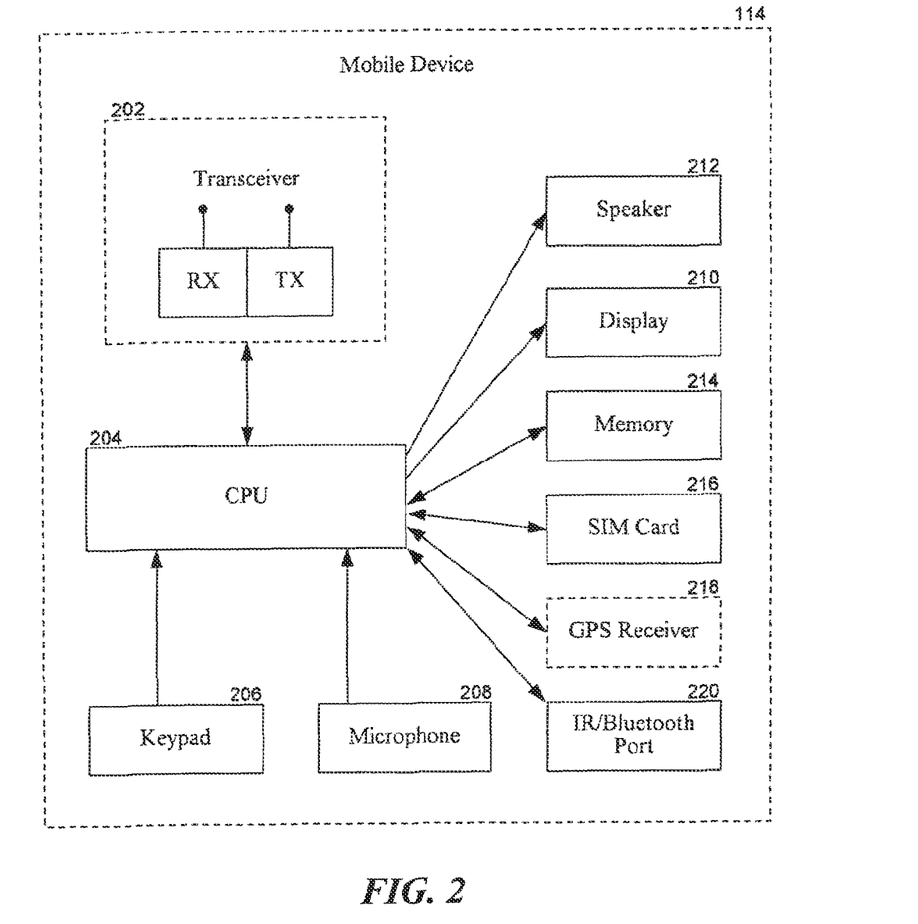
FIG. 2 is a block diagram showing an example of the mobile device of the system of FIG. 1.

FIG. 2 shows a block diagram of a typical mobile communication device 114 of FIG. 1, such as a mobile handset. The mobile device 114 includes a transceiver 202 connected to an antenna (not shown). The transceiver 202 typically provides modulation and demodulation of the transmitted and received signals, respectively. A processor unit or CPU 204 connected to the transceiver 113 may comprise a signal processor, microprocessor, ASIC, or other control and processing logic circuitry. The processor unit 204 may perform signal coding, data processing, input/output processing, power control, and other functions necessary for implementing a mobile communication device.

A user provides input to the processor unit 204 via a keypad 206, microphone 208, or display/touchpad 210. In turn, the processor 204 provides information to the customer via the display/touchpad 210 or a speaker 212.

The processor 204 accesses information from, and stores information in, a memory 214/216, which can be removable 216 or non-removable 214. The non-removable memory 214 may consist of RAM, ROM, a hard disk, or other well-known memory storage technologies. The removable memory 216 may consist of User Identity Module (SIM) cards, which are well known in GSM communication systems, or other well-known memory storage technologies, such as "smart cards." Applications such as native applications and downloaded applications 408 could be implemented in either removable memory 216 or non-removable memory 214. User preference information relating to notifications can also be stored in memory 214/216.

The mobile communication device 114 may also include a GPS receiver 218 and an IP/Bluetooth module/port 220.

Figure 3:
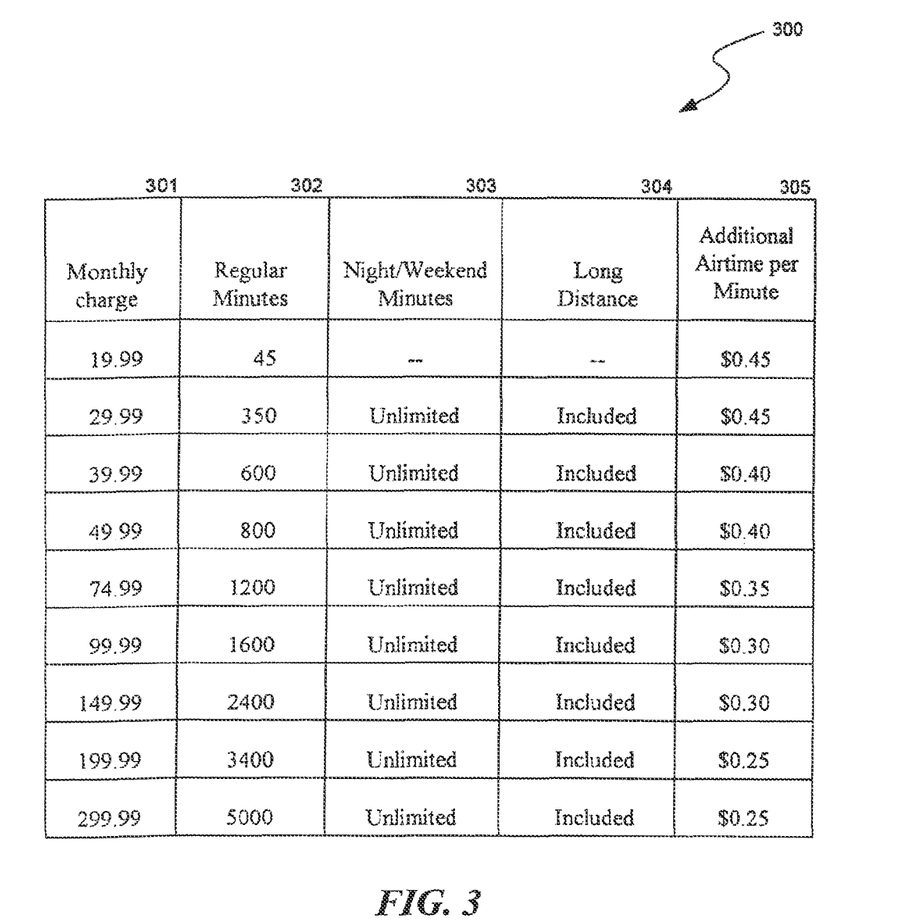
FIG. 3 is an example of service plan options available to the mobile device of FIG. 2.

FIG. 3 is a diagram showing a typical monthly service plan chart 300 for users of mobile devices, such as the mobile device 114 of FIG. 1. Column 301 shows a monthly charge for each service plan. Column 302 shows the "regular" minutes available for each calling plan. For example, the calling plan having the monthly charge of $29.99 has 350 regular monthly minutes available. In contrast, the calling plan having the cost of $299.99 has 5,000 regular minutes available to the user.

Column 303 shows the night and weekend minutes available to the user under each calling plan. In the calling plans shown in the illustrated embodiment, this counts as an unlimited number of night/weekend minutes (except for the $19.99 calling plan). Having a distinction between regular minutes and night/weekend minutes typically complicates a user determining important usage information when the technique described herein is not used.

Column 304 shows whether long distance is included in the monthly charge. Column 305 shows additional airtime charges per minute, for each minute that the user goes over the minutes allocated in their monthly plan. For example, under the $74.99 calling plan, if a user exceeds 1,200 regular weekday minutes, the user will then be charged an additional charge of $0.35 per minute, for each minute used during non-night/weekend times.

Figure 4:
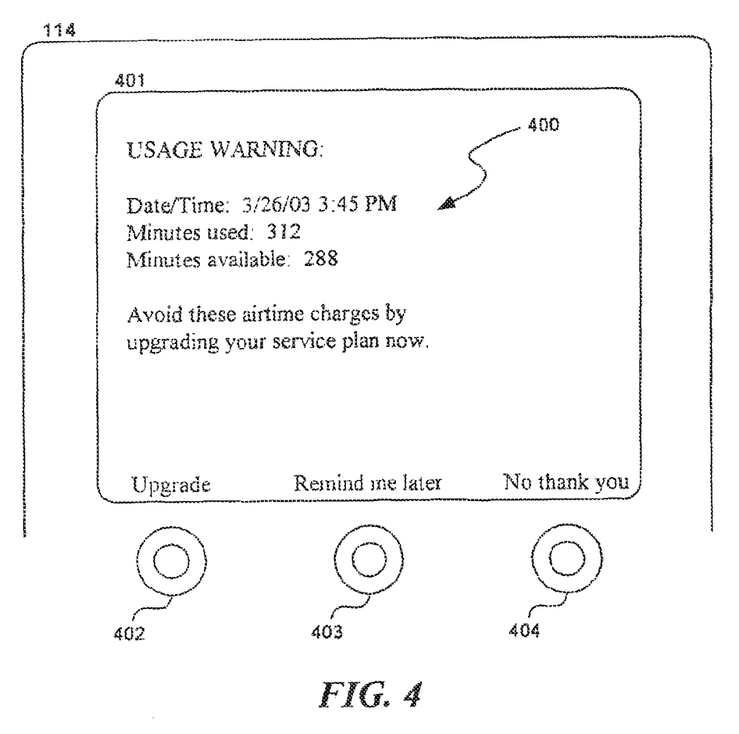
FIG. 4 is a display diagram showing an example of a minutes-of-use notification for one of the service plan options of FIG. 3.

Referring to FIG. 4, a display diagram shows a "minutes-of-use" notification 400 on the display screen 401 of a mobile device such as the mobile device 112 of FIG. 1. The notification 400 shows a date and a number of minutes used (in this case 312 minutes). The notification also shows the number of available minutes remaining for the billing cycle (in this case 288 minutes). The notification also provides an option for the user to avoid extra airtime charges by upgrading his or her service plan. To assist the user in such an upgrade, the notification provides three options for the user. For example, the user may select to upgrade his or her plan by selecting a button 402 associated with an upgrade option displayed on the user's screen. In some embodiments, selecting this button may result in an automatic update to a next level of service plan, may provide the user with a screen of more detailed upgrade information, or may connect the user with a live customer service representative.

As the warning may be presented to the user while he or she is in the process of making a call, the user may select to be reminded of the upgrade option at a later (more convenient) time by selecting a button 403 associated with a "remind me later" option displayed on the screen 401. In the illustrated embodiment, the user has a third option of declining the offer to upgrade airtime charges by selecting a button 404 associated with a "no thank you" option displayed on the display screen 401.

If the user receives the notification before a call is made, the user may dial the call as usual but is interrupted by a tone or beep signifying the receipt of a notification so that the user can learn of and respond to the conditions before the call is made. In some embodiments, the user could hear a beep and then be prompted to select a button associated with a "yes"

option, a "no" option, or a "remind me after the call" option before making the call. As an alternative or in addition to the visual notification shown in FIG. 4, the user could listen to a voice message that provides the notification information in an audible form.

Figure 5:
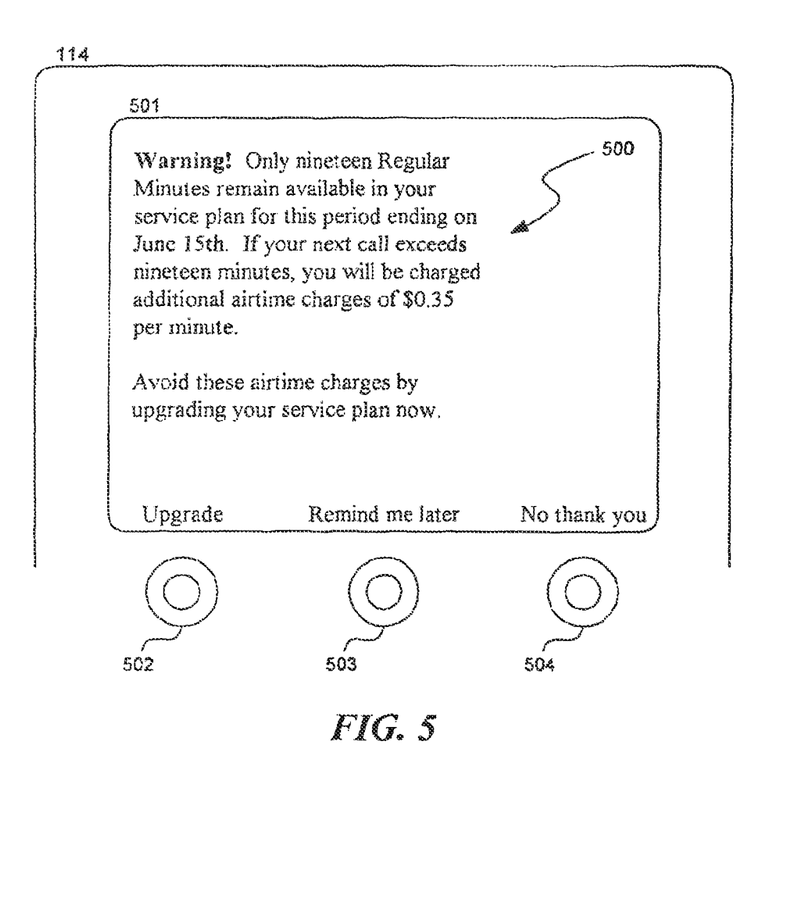
FIG. 5 is a display diagram showing a second example of a minutes-of-use notification for one of the service plan options of FIG. 3.

Referring to FIG. 5, a display diagram shows a second example of a "minutes-of-use" notification 500 displayed on a display screen 501 of the mobile device 114. The notification 500 warns the user of the mobile device 114 that he or she has only "nineteen Regular Minutes" remaining on his or her current service plan (for a period ending on June 15). The notification 500 further provides that the user will be charged additional airtime charges of $0.35 per minute in accordance with their current calling plan. This type of notification may be received in response to the communication service provider subsystem identifying that a particular threshold (possibly specified by the user) has been reached as a result of the last call made using the mobile device 114.

Like the display of FIG. 4, the notification 500 provides an option for the user to avoid excess airtime charges by upgrading the service plan. For example, the user may select to upgrade his or her plan by selecting a button 502 associated with an upgrade option displayed on the display screen 501. The user may also select to be reminded of the upgrade option at a later time by selecting a button 503 associated with a "remind me later" option displayed on the display screen 501. The user has a third option of declining the offer to upgrade airtime charges by selecting a button 504 associated with a "no thank you" option displayed on the display screen 501.

Figure 6:
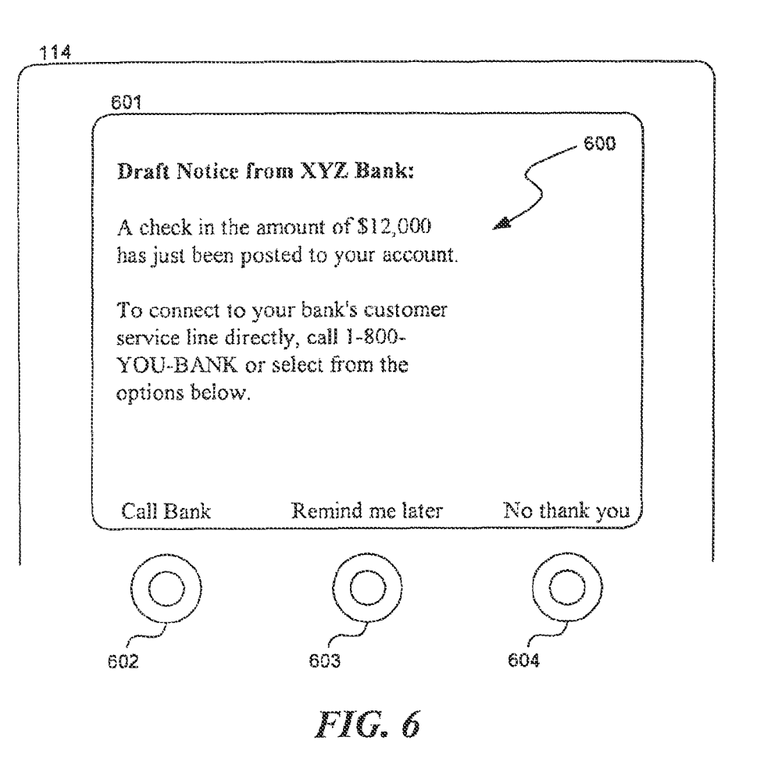
FIG. 6 is a display diagram showing an example of a notification originating from a source external to the communication service provider subsystem of FIG. 1.

Referring to FIG. 6, a display diagram shows a notification 600 associated with an event occurring at a source external to the service provider subsystem. In the illustrated embodiment, the notification 600 being displayed on the screen 601 on the mobile device 114 is a draft notice from the user's bank. It shows that a check has posted to the user's account. The notice 600 provides the user with information about calling the bank's customer service line in case there is a problem. The user is also provided with three options for responding to the notification using the mobile device 114. For example, by selecting a button 602 on the phone associated with a "call bank" option 602, the user can be connected directly with the bank via the mobile device. Alternatively, the user can be reminded later to contact the bank by selecting a button 603 associated with a "remind me later" option. Should the user wish to decline the offer to contact the bank, the user can select a button 604 associated with "no thank you" option and the notification will be discarded or saved in an archive on the user device.

Figure 7:
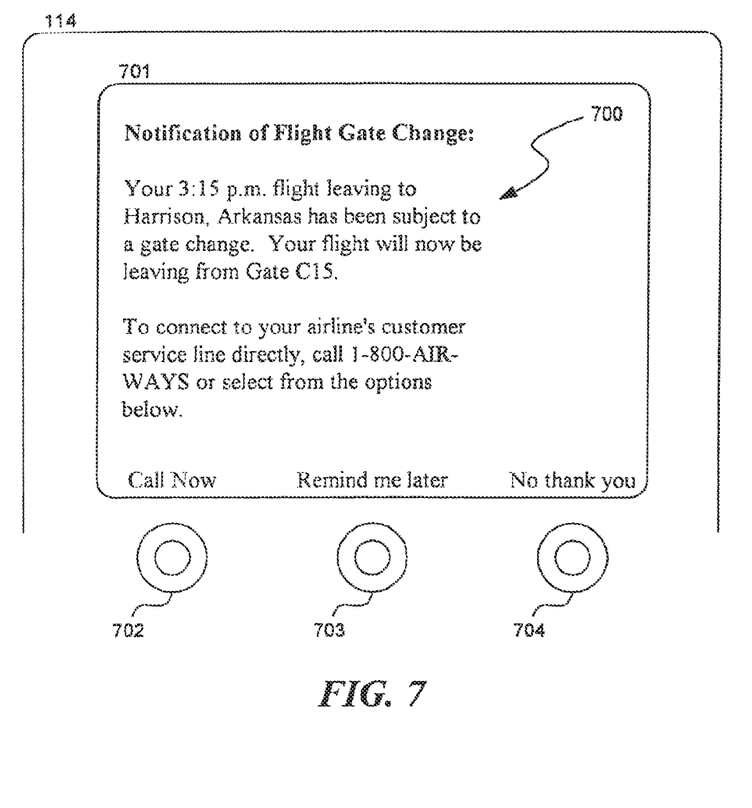
FIG. 7 is a display diagram showing a second example of a notification originating from a source external to the communication service provider subsystem of FIG. 1.

Referring to FIG. 7, a notification 700 for an event occurring external to the system of the service provider is displayed on a screen 701 of the mobile device 114. In this notification 700, the user is notified of a gate change for an upcoming flight on which the user is scheduled to depart. The user is notified of the new gate number and is provided the option of contacting the airline's customer service line by dialing a toll-free number. In addition, the user is given three options that he or she may execute directly by selecting buttons (702, 703, and 704) on the mobile device 114, including a "call now" option, a "remind me later" option, and a "no thank you" option.

Figure 8:
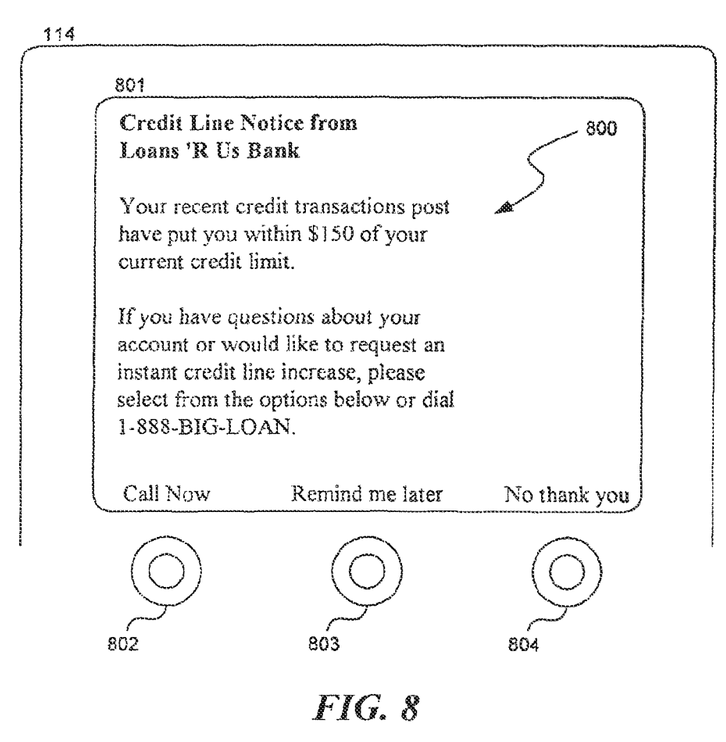
FIG. 8 is a display diagram showing a third example of a notification originating from a source external to the communication service provider subsystem of FIG. 1.

Referring to FIG. 8, a notification 800 resulting from an event occurring external to the service provider subsystem is displayed on a display screen 801 of the mobile device. The user is being notified of the fact that he or she is nearing a credit-line threshold for a credit card account. More specifically, the user is notified that he or she is within $150 of a current credit limit. The user is provided the option of calling the credit card company in the case that the user has questions or would like to request an instant credit-line increase. The user is also given three additional options: the user can call the credit card company by selecting a button 802 associated with a "call now" option; the user can be reminded later by selecting a button 803 associated with a "remind me later" option; or the user can decline the offer by selecting a button 804 associated with a "no thank you" option.

III. REPRESENTATIVE FLOWS

Figure 9:
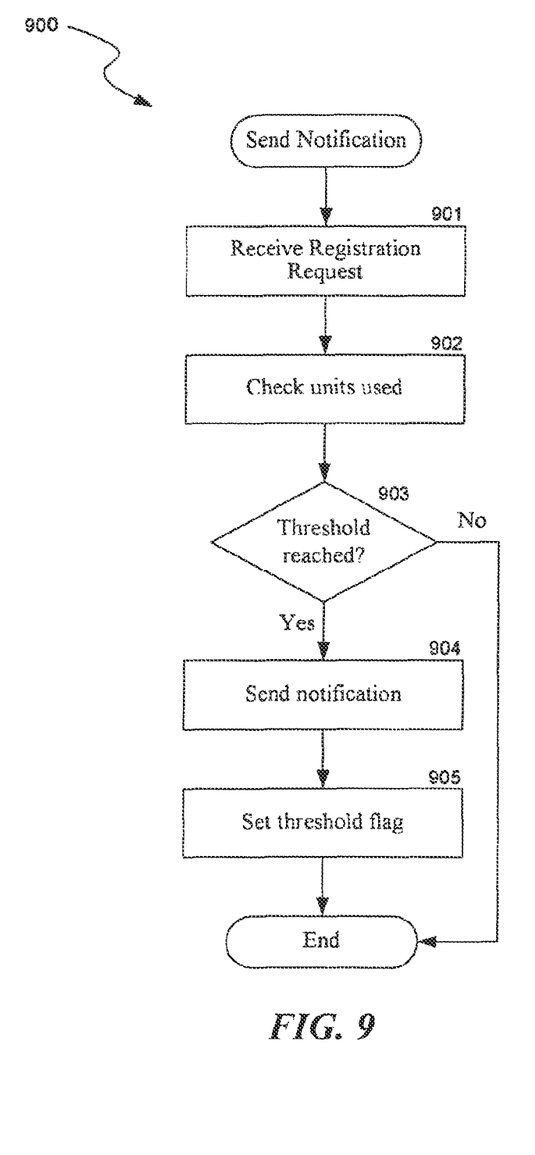
FIG. 9 is a flow diagram showing an example of a send notification routine performed at the communication service provider subsystem of FIG. 1.
Figure 10:
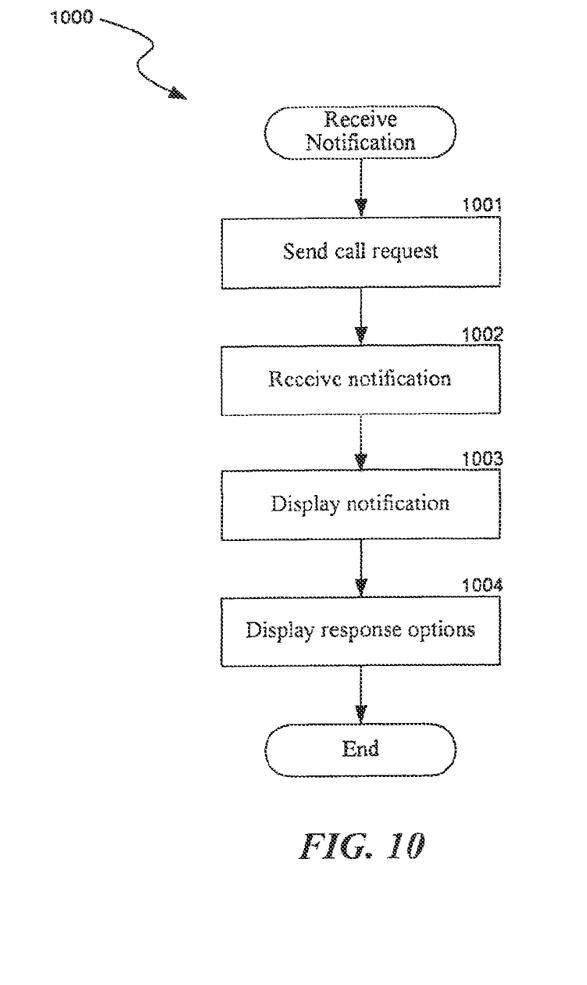
FIG. 10 is a flow diagram showing an example of a receive notification routine as performed at the mobile device of FIG. 1.
Figure 11:
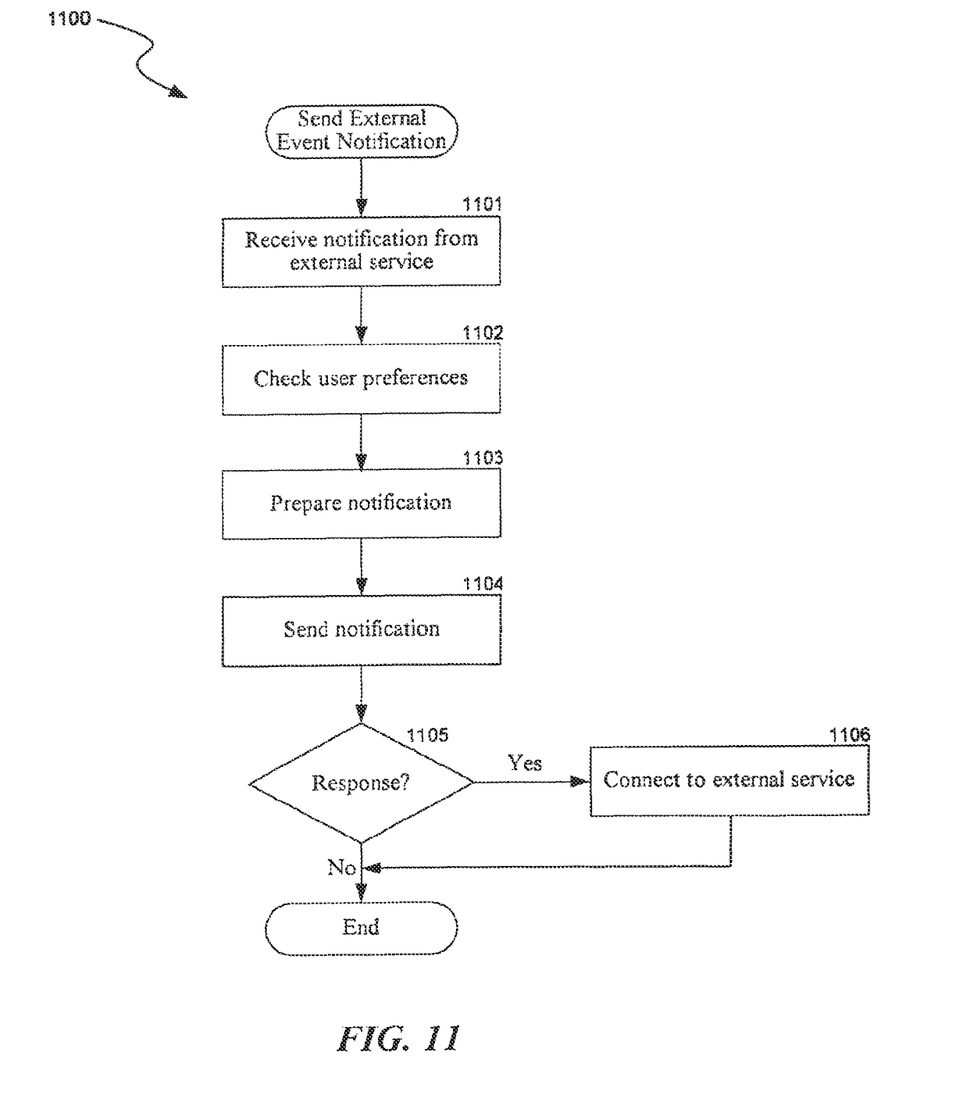
FIG. 11 is a flow diagram showing a second example of a send notification routine performed at the communication service provider system of FIG. 1.

FIGS. 9-11 are representative flow diagrams that depict processes used in some embodiments. These flow diagrams do not show all functions or exchanges of data, but instead they provide an understanding of commands and data exchanged under the system. Those skilled in the relevant art will recognize that some functions or exchange of commands and data may be repeated, varied, omitted, or supplemented, and other (less important) aspects not shown may be readily implemented.

Referring to FIG. 9, a send notification routine 900 may be performed at the communication service provider subsystem of FIG. 1. The illustrated send notification routine 900 is associated with a minutes-of-use notification event, such as the notifications of FIGS. 4 and 5. At block 901, the communication service provider subsystem receives a registration request from the user of a mobile device. For example, the registration request is received when the user is attempting to place a call via the mobile communication device, or after the user hangs up after making a call. At block 902 the communication service provider subsystem checks units used for the account associated with the mobile device making the registration request. This process may involve the use of an event manager, such as the event manager 112 of FIG. 1. As one example, the billing database 110 sends a message to the event manager 112 indicating that the "bucket" is half-empty. The event manager 112 then sends a message to an MSC, such as the MSC 110 of FIG. 1, requesting that an encoded message be generated.

At decision block 903, if some threshold-level of units has been reached, the routine continues at block 904. If, however, at decision block 903 the threshold has not been reached, the routine ends. At block 904 the routine sends a notification to the user of the mobile device making the registration request. At block 905, the routine sets a threshold flag indicating that a threshold-level of minutes has been reached. In this way, the subsystem will know to look for a next threshold-level upon receipt of the next registration request. Following block 905, the routine ends.

Referring to FIG. 10, a receive notification routine 1000 may be performed at the wireless communication device. At block 1001 the routine sends a call request to the communication service provider subsystem. At block 1002 the routine receives a notification from the communication service provider. More particularly, in some embodiments, the mobile device may receive the notification message from the event manager 112 of FIG. 1. At block 1003 the routine displays a notification to the user on, for example, a screen or other display device. At block 1004 the routine displays response options to the user in the display device. For example, options such as "call now," "remind me later," or "no thank you" may be displayed alongside buttons on the mobile communication device. Alternatively, the display device may consist of a touch screen where the user may touch buttons associated with the displayed response options.

For the purpose of the configuration of the mobile device in the illustrated embodiment, out-of-band signals are exchanged between the mobile device and the service provider equipment, although in-band signaling could be used. These signals may be exchanged via a hypertext transfer protocol ("HTTP") connection, a wireless application protocol (WAP) connection, or any other wireless communication method including those incorporating XML or VXML.

Referring to FIG. 11, a send external event notification routine 1100, may be performed at, for example, the mobile communication service provider of FIG. 1. At block 1101 the routine receives a notification from an external service such as a credit card company, bank, airline, hotel, etc. At block 1102 the routine checks for user preferences associated with providing the notification to the user. At block 1103 the routine prepares a notification based on the user preferences and on other formatting techniques used to present the notification in a way readable by the mobile communication device. At block 1105 the routine sends a notification to the mobile communication device. At decision block 1105 if the user of the mobile communication device elects to send a response the routine continues at block 1106 where the routine connects to an external service (e.g., bank, credit card company, airline, hotel, restaurant, etc.). If the user of the mobile communication device does not send a response at decision block 1105, the routine ends. Likewise, the routine ends after the connection to the external service is made at block 11106.

VI. CONCLUSION

The above detailed descriptions of embodiments of the invention are not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while steps or components are presented in a given order, alternative embodiments may perform routines having steps or components in a different order. The teachings of the invention provided herein can be applied to other systems, not necessarily the network communication system described herein. The elements and acts of the various embodiments described above can be combined to provide further embodiments and some steps or components may be deleted, moved, added, subdivided, combined, and/or modified. Each of these steps may be implemented in a variety of different ways. Also, while these steps are shown as being performed in series, these steps may instead be performed in parallel, or may be performed at different times.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words in the above detailed description using the singular or plural number may also include the plural or singular number respectively. Additionally, the words "herein," "above," "below," and words of similar import, when used in this application, shall refer to this application as a whole and not to any particular portions of this application. When the claims use the word "or" in reference to a list of two or more items, that word covers all of the following interpretations of the word: any of the items in the list, all of the items in the list, and any combination of the items in the list.

The teachings of the invention provided herein could be applied to other systems, not necessarily the system described herein. These and other changes can be made to the invention in light of the detailed description. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

These and other changes can be made to the invention in light of the above detailed description. While the above description details certain embodiments of the invention and describes the best mode contemplated, no matter how detailed the above appears in text, the invention can be practiced in many ways. Details of the system, data model, and management scheme may vary considerably in their implementation details, while still being encompassed by the invention disclosed herein. As noted above, particular terminology used when describing certain features, or aspects of the invention should not be taken to imply that the terminology is being re-defined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the invention.

What is claimed is:

1. A method comprising:
   receiving, at a network device, a user-specified threshold of units of use associated with a mobile device, wherein the user-specified threshold is based, at least in part, on a user-specified number of allocated units of use;
   receiving, at the network device, a request from the mobile device to establish a communication between the mobile device and a remote device;
   before establishing the communication between the mobile device and the remote device, determining at the network device that the user-specified threshold of units of use associated with the mobile device has been exceeded;
   generating a notification comprising an indication that the user-specified threshold of units of use associated with the mobile device has been exceeded, the notification further comprising a plurality of user-selectable options, wherein a first option of the plurality of user-selectable options automatically provides a subscription to an alternative communication service plan; and
   transmitting the notification from the network device to the mobile device.

2. The method of claim 1, wherein the request from the mobile device comprises a telephone number, and wherein the notification comprises the telephone number.

3. The method of claim 1, wherein the plurality of user-selectable options comprises a second option that, when activated by a user, causes the mobile device to present the notification on the mobile device after a predetermined amount of time has elapsed.

4. The method of claim 1, further comprising determining, based on a user preference, to transmit the notification to the mobile device.

5. The method of claim 1, further comprising determining, based on a user preference, a time at which to transmit the notification to the mobile device.

6. The method of claim 1, further comprising receiving, at the network device, a user preference to receive the notification.

7. The method of claim 1, wherein the plurality of user-selectable options comprises a second option that, when activated by a user, causes the mobile device to delete the notification.

8. A network device comprising:
   a memory comprising executable instructions; and
   a processor, wherein the processor, when executing the executable instructions, effectuates operations comprising:
      receiving a user-specified threshold of units of use associated with a mobile device, wherein the user-specified threshold is based, at least in part, on a user-specified number of allocated units of use;
      receiving a request from the mobile device to establish a communication between the mobile device and a remote device;
      before establishing the communication between the mobile device and the remote device, determining that the user-specified threshold of units of use associated with the mobile device has been exceeded;
      generating a notification comprising an indication that the user-specified threshold of units of use associated with the mobile device has been exceeded, the notification further comprising a plurality of user-selectable options, wherein a first option of the plurality of user-selectable options automatically provides a subscription to an alternative communication service plan; and
      transmitting the notification to the mobile device.

9. The network device of claim 8, wherein the request from the mobile device comprises a telephone number, and wherein the notification comprises the telephone number.

10. The network device of claim 8, wherein the plurality of user-selectable options comprises a second option that, when activated by a user, causes the mobile device to present the notification on the mobile device after a predetermined amount of time has elapsed.

11. The network device of claim 8, further comprising the operation of determining, based on a user preference, to transmit the notification to the mobile device.

12. The network device of claim 8, further comprising the operation of determining, based on a user preference, a time at which to transmit the notification to the mobile device.

13. The network device of claim 8, further comprising the operation of receiving a user preference to receive the notification.

14. The network device of claim 8, wherein the plurality of user-selectable options comprises a second option that, when activated by a user, causes the mobile device to delete the notification.

15. A tangible computer-readable storage medium that is not a propagating signal, the tangible computer-readable storage medium comprising computer-executable instructions, which when executed by a processor 011 a network device, cause the processor to effectuate operations comprising:
   receiving a user-specified threshold of units of use associated with a mobile device, wherein the user-specified threshold is based, at least in part, on a user-specified number of allocated units of use;
   receiving a request from the mobile device to establish a communication between the mobile device and a remote device;
   before establishing the communication between the mobile device and the remote device, determining that the user-specified threshold of units of use associated with the mobile device has been exceeded;
   generating a notification comprising an indication that the user-specified threshold of units of use associated with the mobile device has been exceeded, the notification further comprising a plurality of user-selectable options, wherein a first option of the plurality of user-selectable options automatically provides a subscription to an alternative communication service plan; and
   transmitting the notification to the mobile device.

16. The tangible computer-readable storage medium device of claim 15, wherein the request from the mobile device comprises a telephone number, and wherein the notification comprises the telephone number.

17. The tangible computer-readable storage medium device of claim 15, wherein the plurality of user-selectable options comprises a second option that, when activated by a user, causes the mobile device to present the notification on the mobile device after a predetermined amount of time has elapsed.

18. The tangible computer-readable storage medium device of claim 15, further comprising the operation of determining, based on a user preference, to transmit the notification to the mobile device.

19. The tangible computer-readable storage medium device of claim 15, further comprising the operation of determining, based on a user preference, a time at which to transmit the notification to the mobile device.

20. The tangible computer-readable storage medium device of claim 15, further comprising the operation of receiving a user preference to receive the notification.

* * * * *